Patented Mar. 12, 1940

2,192,964

UNITED STATES PATENT OFFICE 2,192,964

SAPONIFICATION OF CELLULOSE ESTER TEXTILE MATERIALS

Henry Dreyfus, London, England

No Drawing. Application May 5, 1937, Serial No. 140,896. In Great Britain June 3, 1936

3 Claims. (Cl. 8—130)

This invention relates to the manufacture of materials comprising filaments, fibres, yarns, ribbons, films and the like containing cellulose acetate or other organic esters of cellulose, and is particularly concerned with the saponification of such materials.

According to the present invention such materials are saponified by treatment with guanidine. Thus by employing an aqueous solution of guanidine as the saponifying agent, a rapid saponification may be carried out without deleteriously affecting the serimetric properties of the material. The treatment may, in fact, considerably increase the tenacity and/or the extensibility of the materials.

According to a modification of the invention alkyl and aralkyl derivatives of guanidine, such for example as methyl guanidine, dimethyl guanidine, and symmetrical dibenzyl guanidine may be employed instead of guanidine itself. It is to be understood that the term "a guanidine compound" employed in the claims includes such derivatives as well as guanidine itself.

The guanidine or guanidine derivative may be applied to the materials to be treated in any suitable manner. Preferably it is applied in a medium containing hydroxy groups, and particularly good results are obtained by applying it in aqueous solution. The guanidine or guanidine derivative may, however, be applied in alcoholic solution or in solution in a mixture of water and alcohol. The alcohol present may be, for example, methyl, ethyl, propyl or butyl alcohol, ethylene glycol or its monomethly or monoethyl ether, glycerol, benzyl alcohol, cyclohexanol or diacetone alcohol. Other hydroxy solvents, swelling agents or latent solvents for the organic ester of cellulose may be present. The saponifying medium may contain a non-hydroxy solvent, swelling agent or latent solvent, for example cyclohexanone, acetone, methyl-ethyl-ketone, dioxane, methylene ethylene ether, ethylidene ethylene ether, or the dimethyl ether of ethylene glycol.

The saponifying medium may contain a substance which diminishes its swelling action on the organic ester of cellulose, as described in U. S. application S. No. 81,268 filed May 22, 1936, Patent No. 2,091,972. Examples of such substances are sugars and water-soluble salts of organic acids, particularly non-soap forming aliphatic acids, e. g., the sodium, potassium and ammonium salts of acetic, tartaric, citric and lactic acids, end of poly-basic inorganic acids, e. g., the sodium, potassium and ammonium salts of sulphuric thio-sulphuric and phosphoric acids, excluding tri-sodium and tri-potassium phosphates.

Preferably the saponifying medium is applied in a bath treatment, and when an aqueous solution of guanidine is employed a concentration of 3–10 or 20% of guanidine is suitable. A temperature between 30 and 60° C., or even higher, or less than 30° C., for instance 15 to 20° C., may be employed. The saponifying medium may or may not be under pressure. The materials may be passed through a bath containing the saponifying agent, at a rate depending upon the concentration of the guanidine or guanidine derivative present, the temperature of the bath, and the amount of saponification desired. Yarns of cellulose acetate or other organic esters of cellulose may be passed continuously through the bath, preferably in "warp formation," i. e., a large number of ends are drawn through the bath in substantially parallel relationship to each other and in the same plane. Thus yarns in warp formation may be drawn by means of suitable godets, rolls, or like members, partially or completely immersed in the bath and extending across the whole warp, through a reed into and through the bath, and then through a further reed or reeds to suitable collecting means situated outside the bath. Preferably the yarns are washed and dried before being wound.

The yarns may, however, be treated in hank form by suspending the hanks from rods which are caused to travel from one end of the bath to the other but at the same time to revolve so as to immerse each portion of the hank in turn to the same depth. Yarns in the form of hanks, cakes or other suitable packages, for instance wound on foraminous supports, may be introduced into a bath containing the saponifying agent and allowed to remain in contact therewith until the desired degree of saponification is effected; or the saponifying medium may be circulated through the yarn, for instance it may be pumped backwards and forwards through yarn wound on a foraminous package carrier.

As indicated above, the materials may be saponified in fabric form, and a convenient manner of effecting such saponification is by passing the fabric continuously through a bath containing the saponifying medium, for example in apparatus of the type of the winch dyeing machine.

The materials undergoing saponification may be maintained under considerable applied tension, or may be under little or no tension, so that contraction may take place. In the case of travelling materials the rate of travel may be made to decrease along their path with a view to minimizing the tension.

The materials prior to saponification may be pre-treated in order to facilitate penetration of the saponifying medium. Thus the materials may be pre-treated with water or an aqueous wetting agent, for example a soap.

The invention is of particular importance in connection with the saponification of filaments, threads, yarns, fibres, ribbons and the like containing cellulose acetate, and of fabrics containing such materials, but it is also of value in saponifying materials containing other organic esters of cellulose, for instance cellulose formate, cellulose propionate, cellulose butyrate and cellulose nitro-acetate, and ether-esters of cellulose, for instance, ethyl cellulose acetate and oxyethyl cellulose acetate.

The filaments and the like treated may be made by wet or dry spinning processes. The cellulose acetate or other organic esters of cellulose forming the basis of the materials may be of high, medium or low viscosity. Thus in the case of cellulose acetate, the viscosity may be between 10 or less and 25 or 30, or may be higher, for example 30 up to 100, 200 or more, these figures being those obtained by comparing the viscosity of a 6% solution of the cellulose acetate in acetone at 25° C., with the viscosity of glycerine at the same temperature taken as a standard of 100.

The materials treated may have been submitted to a stretching operation, for instance they may have been formed by a wet spinning process in which they are stretched considerably, or they may have been stretched after their formation under the influence of an organic or inorganic softening agent, or of steam or hot water. The products of such processes are of high tenacity, e. g., 2.5–3, 4 or more grams per denier, and afford particularly valuable products when treated according to the present invention. The materials stretched or unstretched may have been subjected to shrinkage, for instance by treatment with methylene chloride-benzene mixture.

By means of the process of the invention, the materials may be saponified to any desired extent, for instance to such an extent that the materials acquire an affinity for cotton dyestuffs but do not lose their affinity for cellulose ester dyestuffs, for example the dispersed insoluble dyes, or to such an extent that the affinity for cellulose ester dyestuffs is destroyed. The materials may be saponified to raise the safe ironing point. The degree of saponification effected may be sufficient to reduce the acidyl content of the ester by 10% or less, or the loss of acidyl may be considerably higher, for instance there may be a loss of 20 to 30 or 40% or even more of the acidyl content. The materials may even be saponified completely.

The following example illustrates the invention:

Cellulose acetate artificial silk of high tenacity is immersed in a 4–6% aqueous solution of guanidine at 40–50° C. until completely saponified. It is then removed, washed and dried.

In a similar way alkyl or aralkyl substituted guanidines can be used, e. g., mono- or di-methyl guanidine or symmetrical dibenzyl guanidine.

Colouration of the materials, for instance with cotton dyestuffs or cellulose ester dyestuffs according to the degree of saponification, may be effected continuously with saponification, and dyestuffs, for instance dispersed insoluble dyes, may be applied in the saponifying medium itself.

Having described my invention what I desire to secure by Letters Patent is:

1. Process for the production of improved artificial materials, which comprises immersing materials comprising filaments, fibers, yarns, ribbons and the like having a basis of a ripened organic ester of cellulose and tenacity of at least 2.5 grams per denier in a 3 to 20% aqueous solution of guanidine until the acidyl content of the materials is reduced to at least 20% of the original acidyl content of the materials.

2. Process for the production of improved artificial materials, which comprises immersing materials comprising filaments, fibers, yarns, ribbons and the like having a basis of acetone-soluble cellulose acetate and tenacity of at least 2.5 grams per denier in a 3 to 20% aqueous solution of guanidine until the acidyl content of the materials is reduced to at least 20% of the original acidyl content of the materials.

3. Process for the production of improved artificial materials, which comprises immersing materials comprising filaments, fibers, yarns, ribbons and the like having a basis of acetone-soluble cellulose acetate and tenacity of at least 2.5 grams per denier in a 3 to 20% aqueous solution of guanidine until the materials are substantially completely saponified.

HENRY DREYFUS.